(12) United States Patent
Kim et al.

(10) Patent No.: US 11,366,538 B2
(45) Date of Patent: Jun. 21, 2022

(54) DISPLAY DEVICE INCLUDING AN ALIGN KEY

(71) Applicant: SAMSUNG DISPLAY CO., LTD., Yongin-si (KR)

(72) Inventors: Young Rae Kim, Cheonan-si (KR); Jung Tae Kim, Seoul (KR); Kyung Min Park, Seongnam-si (KR); Dong-Yoon So, Hwaseong-si (KR); Ji Hyeon Ryu, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/994,996

(22) Filed: Aug. 17, 2020

(65) Prior Publication Data
US 2021/0191551 A1 Jun. 24, 2021

(30) Foreign Application Priority Data
Dec. 18, 2019 (KR) .................. 10-2019-0169537

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
None
See application file for complete search history.

(56) References Cited

U.S. PATENT DOCUMENTS

| 2015/0205424 A1* | 7/2015 | Park | G06F 3/04164 |
| | | | 345/174 |
| 2015/0255740 A1* | 9/2015 | Nakada | H01L 51/5237 |
| | | | 257/40 |
| 2017/0097712 A1* | 4/2017 | Aoki | G06F 3/0412 |

FOREIGN PATENT DOCUMENTS

| KR | 10-0579546 | 5/2006 |
| KR | 10-2017-0018693 | 2/2017 |
| KR | 10-2019-0957829 | 5/2019 |

* cited by examiner

*Primary Examiner* — Brian M Butcher
(74) *Attorney, Agent, or Firm* — F. Chau & Associates, LLC (57) ABSTRACT

A display device includes a first substrate, a display structure, a sensing structure, a sensing signal transmission film, and an image signal transmission film. The first substrate includes a display region and a non-display region at least partially surrounding the display region. The non-display region includes a first portion and a second portion facing the first portion. The display structure is disposed in the display region. The sensing structure is disposed on the display structure. The sensing signal transmission film is electrically connected to the sensing structure. The image signal transmission film is electrically connected to the display structure. The sensing signal transmission film is disposed in the first portion of the non-display region. The image signal transmission film is disposed in the second portion of the non-display region.

18 Claims, 11 Drawing Sheets

DISPLAY DEVICE INCLUDING AN ALIGN KEY

CROSS-REFERENCE TO RELATED APPLICATION

This patent application claims priority under 35 U.S.C. § 119 to Korean Patent Application No. 10-2019-0169537, filed on Dec. 18, 2019 in the Korean Intellectual Property Office (KIPO), the disclosure of which is herein incorporated by reference in its entirety.

TECHNICAL FIELD

The present disclosure relates generally to a display device, and more particularly, to a display device including an align key.

DESCRIPTION OF THE RELATED ART

A conventional cathode ray tube CRT may have large volume and weight. Various flat panel display devices have been developed to reduce weight and volume. Some examples of flat panel display devices may include liquid crystal displays LCDs, field emission displays FEDs, plasma display panels PDPs, organic light emitting diode displays OLEDs, quantum-dot light emitting diode displays QLEDs, etc. A transistor and a light emitting element may be disposed in a display region of a display device, and a signal transmission film that provides a signal to the transistor may be disposed in a non-display region surrounding the display region. To accurately dispose the signal transmission film at a target position, an align key may be formed in the non-display region. For example, the signal transmission film may be disposed by aligning the signal transmission film according to a position of the align key after the position of the align key is recognized. However, an area of the align key may be reduced following a reduction in a size or area of the non-display region, so that the position of the align key might not be clearly recognized. Accordingly, the signal transmission film might not be aligned accurately at a target position.

SUMMARY

Some exemplary embodiments of the inventive concept provide a display device including an align key.

According to an exemplary embodiment of the inventive concept, a display device may include a first substrate, a display structure, a sensing structure, a sensing signal transmission film, and an image signal transmission film. The first substrate includes a display region and a non-display region at least partially surrounding the display region. The non-display region includes a first portion and a second portion facing the first portion. The display structure is disposed in the display region. The sensing structure is disposed on the display structure. The sensing signal transmission film is electrically connected to the sensing structure. The image signal transmission film is electrically connected to the display structure. The sensing signal transmission film is disposed in the first portion of the non-display region. The image signal transmission film is disposed in the second portion of the non-display region.

In an exemplary embodiment, the display device may further include a second substrate facing the first substrate and a sealing member disposed between the first substrate and the second substrate, and the sealing member may at least partially surround the display structure.

In an exemplary embodiment, the sensing signal transmission film may be disposed on the second substrate.

In an exemplary embodiment, the display device may further include a first align key disposed in the first portion on the first substrate.

In an exemplary embodiment, the first align key may be disposed between the display structure and the sealing member.

In an exemplary embodiment, the display structure may include an active pattern disposed on the first substrate, a gate electrode disposed on the active pattern, a source electrode disposed on the gate electrode, and a drain electrode disposed on the gate electrode, wherein the first align key may be disposed on a same layer as the active pattern.

In an exemplary embodiment, the display device may further include a metal pattern disposed on the first align key, the metal pattern may at least partially overlap the first align key, and the metal pattern may be disposed on a same layer as the source and drain electrodes.

In an exemplary embodiment, the display device may further include an insulating layer disposed between the first align key and the metal pattern, and the insulating layer may be configured to transmit light.

In an exemplary embodiment, the display device may further include a second align key disposed in the first portion of the first substrate.

In an exemplary embodiment, an area of the second align key may be smaller than an area of the first align key.

In an exemplary embodiment, a shape of the first align key may be different from a shape of the second align key.

In an exemplary embodiment, a planar shape of the first align key may be a cross-shape, the first align key may have a cross-shaped opening, and a planar shape of the second align key may be a step shape.

In an exemplary embodiment, the second align key may be disposed between the display structure and the sealing member.

In an exemplary embodiment, the second align key may be disposed on a same layer as the source and drain electrodes.

In an exemplary embodiment, the second align key may be disposed on a same layer as the metal pattern, and the metal pattern may be spaced apart from the second align key.

In an exemplary embodiment, the second align key may be disposed on a same layer as the active pattern.

In an exemplary embodiment, the sensing signal transmission film may be disposed on the second substrate through the first and second align keys.

In an exemplary embodiment, the display device may further include a third align key disposed in the second portion of the first substrate.

In an exemplary embodiment, the sealing member may be disposed between the display structure and the third align key.

According to an exemplary embodiment of the inventive concept, a display device may include a first substrate, a display structure, a second substrate, a sensing structure, a sensing signal transmission film, an image signal transmission film, a first align key, a second align key, and a third align key. The first substrate includes a display region and a non-display region at least partially surrounding the display region. The non-display region includes a first portion and a second portion facing the first portion. The display structure is disposed in the display region. The second substrate faces the first substrate. The second substrate includes a sealing member at least partially surrounding a boundary of the second substrate. The sensing structure is disposed on the second substrate. The sensing signal transmission film is electrically connected to the sensing structure. The image signal transmission film is electrically connected to the display structure. The sensing signal transmission film is disposed in the first portion of the non-display region. The image signal transmission film is disposed in the second portion of the non-display region. The first align key and the second align key are disposed in the first portion. The third align key is disposed in the second portion. The display structure includes an active pattern disposed on the first substrate, a gate electrode disposed on the active pattern, a source electrode disposed on the gate electrode, and a drain electrode disposed on the gate electrode. The first align key is disposed on a same layer as the active pattern. Each of the second and third align keys is disposed on a same layer as the source and drain electrodes. An area of the first align key is larger than an area of the second align key, and an area of the third align key is larger than the area of the first align key.

Therefore, a display device according to an exemplary embodiment may include a sensing signal transmission film and an image signal transmission film disposed to face each other. Accordingly, the display device may minimize a radius of curvature of the sensing signal transmission film and a radius of curvature of the image signal transmission film, and a non-display region may be reduced. In addition, to align and arrange the sensing signal transmission film and the image signal transmission film, the display device may include first to third align keys. Therefore, the sensing signal transmission film and the image signal transmission film may be accurately aligned and arranged.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EMBODIMENTS

Herein, it will be understood that when an element or layer is referred to as being "on", "connected to" or "coupled to" another element or layer, it can be directly on, connected or coupled to the other element or layer, or intervening elements or layers may be present.

Like reference numerals may refer to like elements throughout this specification. In the figures, the thicknesses of layers, films or regions may be exaggerated for clarity.

As used herein, the singular forms, "a", "an" and "the" are intended to include the plural forms as well, unless the context clearly indicates otherwise.

Hereinafter, exemplary embodiments of the present inventive concept will be explained in detail with reference to the accompanying drawings.

A conventional display device may include a sensing signal transmission film and an image signal transmission film, which are disposed in one portion of the conventional display device. In this case, the sensing signal transmission film may be bent to an outside of the image signal transmission film (e.g., to surround the image signal transmission film), so that a radius of curvature of the sensing signal transmission becomes large. To cover the radius of curvature of the sensing signal transmission film, a size or area of a non-display region NDA corresponding to the one portion of the conventional display device may be increased.

According to embodiments of the present inventive concept, a display device may include a sensing signal transmission film and an image signal transmission film which are disposed to face each other, so that each of a radius of curvature of the sensing signal transmission film and a radius of curvature of the image signal transmission film is minimized. Accordingly, a size or area of a non-display region NDA of the display device may be reduced.

Figure 1:
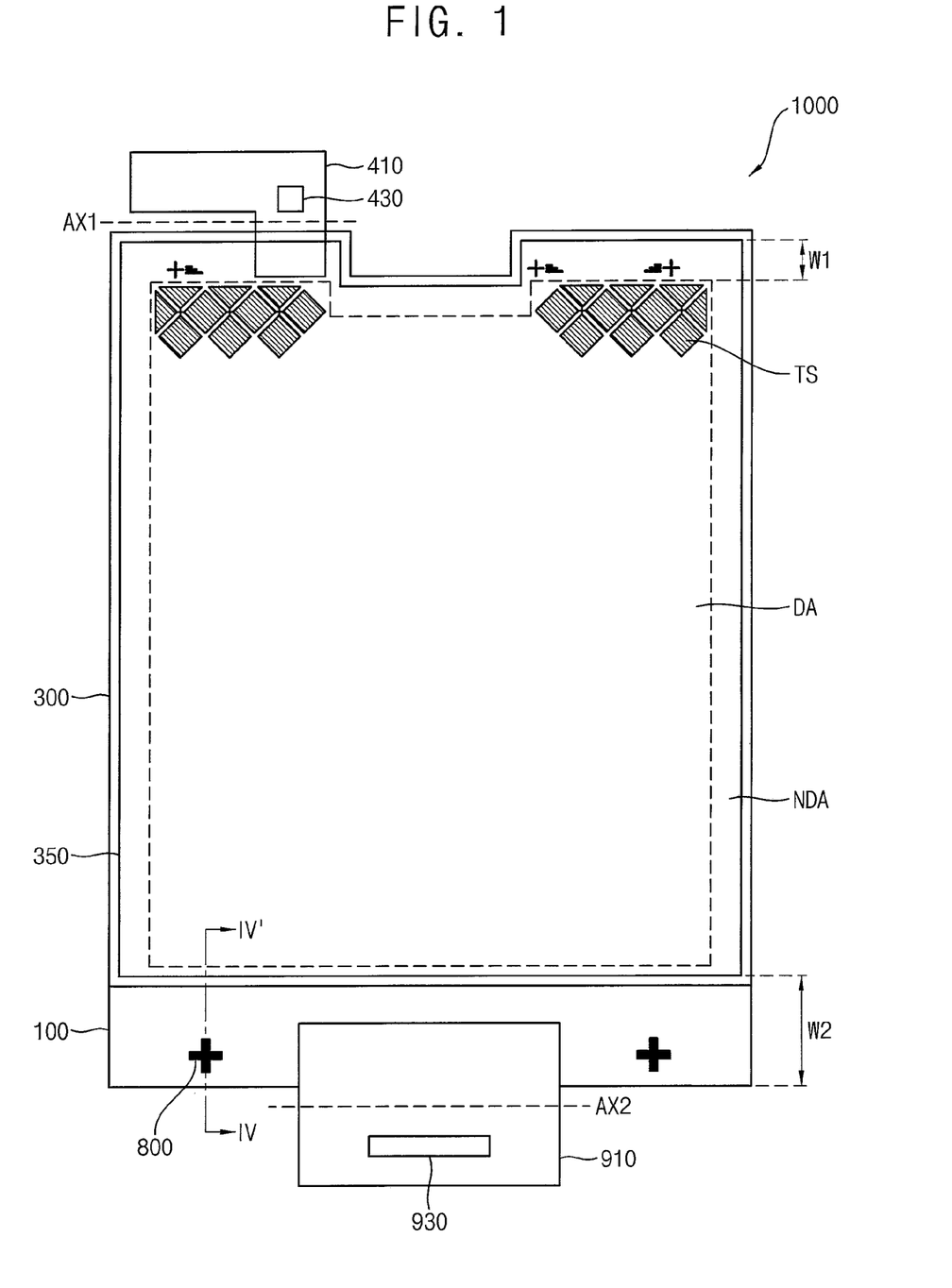
FIG. 1 is a schematic plan view illustrating a display device according to an exemplary embodiment of the inventive concept.
Figure 2:
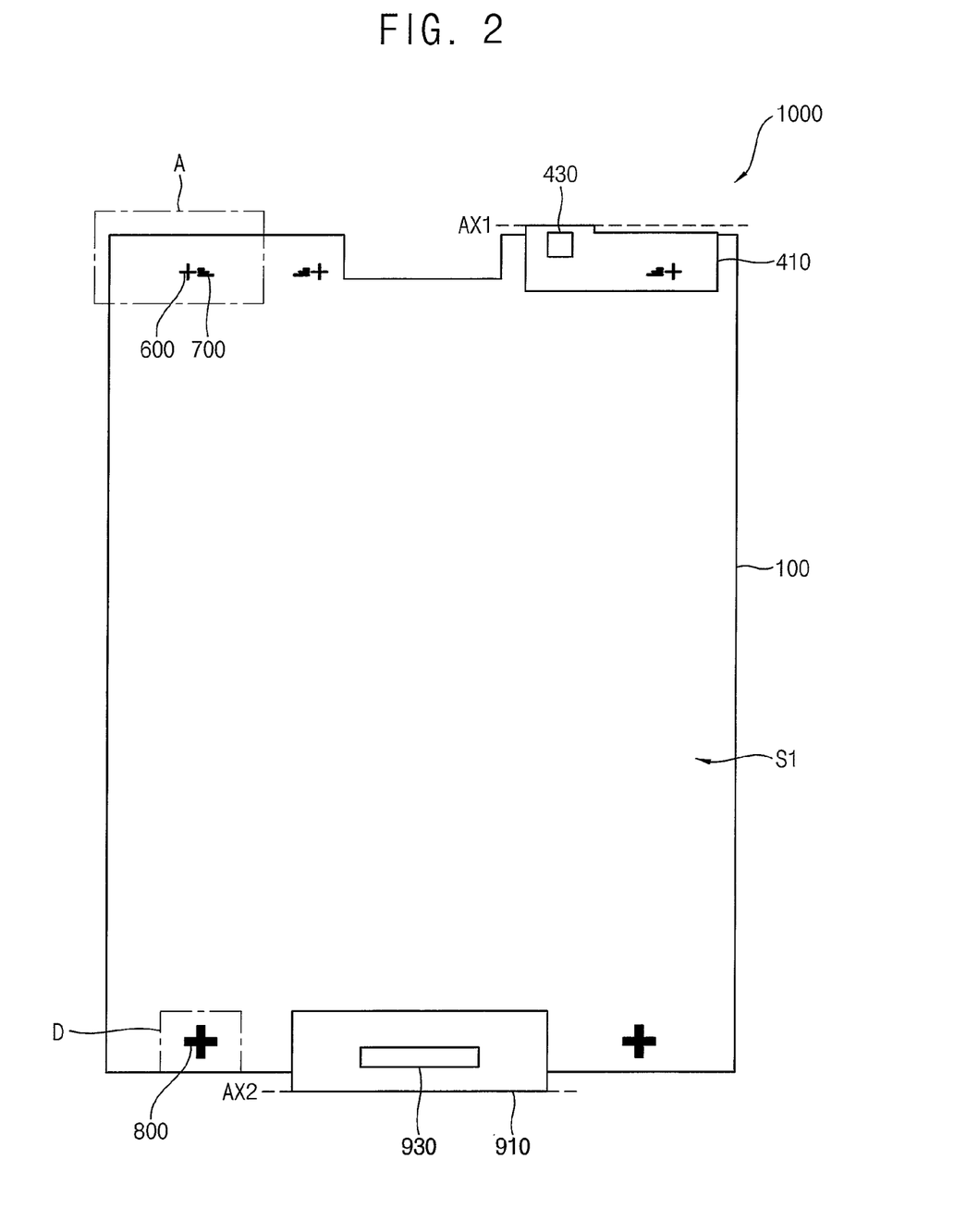
FIG. 2 is a rear view of the display device of FIG. 1 according to an exemplary embodiment of the inventive concept.
Figure 3:
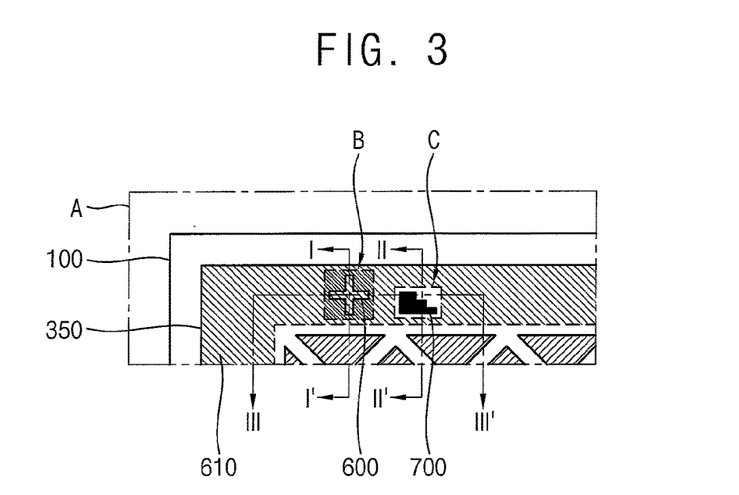
FIG. 3 is an enlarged view of region A of FIG. 2 according to an exemplary embodiment of the inventive concept.
Figure 4:
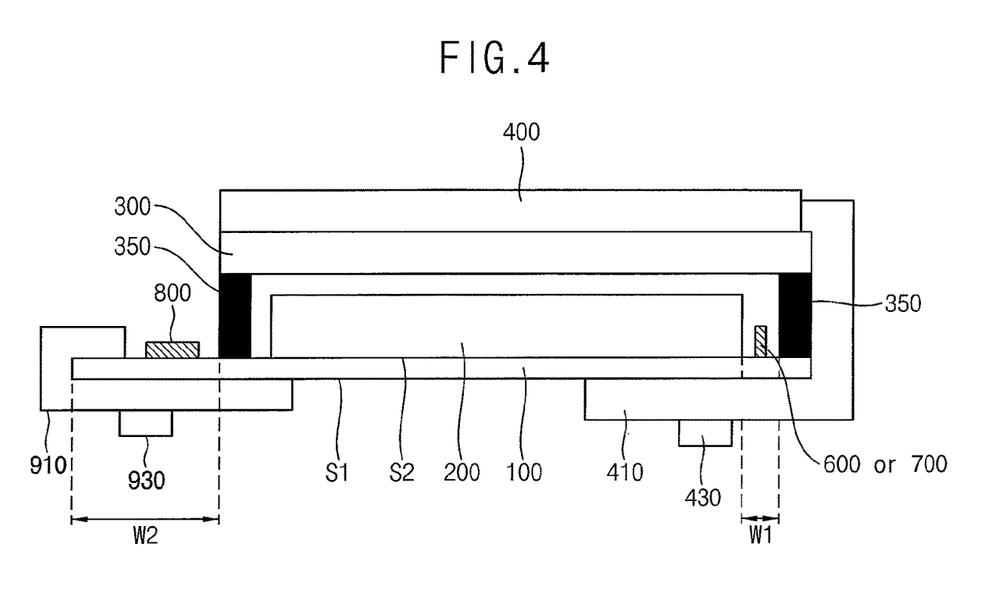
FIG. 4 is a cross-sectional view of the display device of FIG. 1 according to an exemplary embodiment of the inventive concept.

FIG. 1 is a diagram illustrating a plan view of a display device according to an exemplary embodiment of present inventive concept, FIG. 2 is a rear view of the display device of FIG. 1, FIG. 3 is an enlarged view of region A of FIG. 2, and FIG. 4 is a cross-sectional view of the display device of FIG. 1.

Referring to FIGS. 1, 2, 3, and 4, the display device 1000 may include a first substrate 100, a display structure 200, a second substrate 300, a sealing member 350, a sensing structure 400, a first align key 600, a second align key 700, a third align key 800, a sensing signal transmission film 410, a sensing driver 430, an image signal transmission film 910, and an image driver 930.

The first substrate 100 may include a display region DA and a non-display region NDA surrounding the display region DA. The non-display region NDA may include a first portion (e.g., an upper side on a plane of the display device 1000) and a second portion (e.g., a lower side on the plane of the display device 1000) facing opposite to the first portion.

The display structure 200 and the sensing structure 400 may be disposed in the display region DA on the first substrate 100. Drivers for driving the display structure 200 and the sensing structure 400 may be disposed in the non-display region NDA on the first substrate 100. For example, the sensing signal transmission film 410 and the sensing driver 430 which drive the sensing structure 400 may be disposed in the first portion of the non-display region NDA, and the image signal transmission film 910 and the image driver 930 which drive the display structure 200 may be disposed in the second portion of the non-display region NDA.

The display structure 200 may be disposed in the display region DA on the first substrate 100. An image signal may be provided to the display structure 200 through the image signal transmission film 910, and may display an image according to the image signal. The display structure 200 is described below with reference to FIG. 5.

As illustrated in FIG. 4, the second substrate 300 may face the first substrate 100. The sealing member 350 may be disposed between the first substrate 100 and the second substrate 300, and may surround the display structure 200. In one example, the sealing member 350 may surround at least partially side surfaces of the display structure 200. In addition, an upper surface of the sealing member 350 may be in direct contact with a lower surface of the second substrate 300, and a lower surface of the sealing member 350 may be in direct contact with an upper surface S2 of the first substrate 100. The sealing member 350 may prevent impurities or moisture from penetrating into the display structure 200, and may protect the display structure 200. The second substrate 300 may include a substantially same material as the first substrate 100.

In an exemplary embodiment of the inventive concept, an area of the second substrate 300 may be smaller than an area of the first substrate 100, and an end of the first substrate 100 may be aligned with an end of the second substrate 300 in the first portion of the non-display region NDA. In an example, the second substrate 300 may cover just a portion of the first substrate 100. Accordingly, the first substrate 100 may protrude from the second substrate 300 in the second portion of the non-display region NDA. In another exemplary embodiment, the area of the second substrate 300 may be substantially same as the area of the first substrate 100.

Meanwhile, the first substrate 100 and the second substrate 300 may have a substantially same rectangular shape, but shapes of the first substrate 100 and the second substrate 300 are not limited thereto.

The sensing structure 400 may be disposed on the second substrate 300. The sensing structure 400 may include sensing electrodes TS. The sensing electrodes TS may be electrically connected to the sensing signal transmission film 410 so that the sensing driver 430 can sense a user's approach and/or touch.

In an exemplary embodiment of the inventive concept, the sensing structure 400 may be configured to integrate with the second substrate 300 so that the display device 1000 has an On-Cell structure.

The sensing signal transmission film 410 may be disposed in the first portion of the non-display region NDA on the first substrate 100, and may be electrically connected to the sensing structure 400. The sensing structure 400 may further include a sensing pad electrode disposed in the first portion, and the sensing signal transmission film 410 may be electrically connected to the sensing structure 400 through the sensing pad electrode.

In an exemplary embodiment of the inventive concept, the sensing signal transmission film 410 may be disposed on the second substrate 300. For example, after the sensing signal transmission film 410 is disposed in the first portion, the sensing signal transmission film 410 may be bent along a first bending axis AX1 (as shown in FIG. 1). Accordingly, the sensing signal transmission film 410 may cover a portion of an upper surface of the second substrate 300 and a portion of a lower surface S1 of the first substrate 100. For example, the sensing signal transmission film 410 may include a flexible printed circuit board.

In an exemplary embodiment of the inventive concept, the sensing driver 430 may be disposed in the sensing signal transmission film 410, and the sensing driver 430 may generate a sensing signal. The sensing signal may include a plurality of sensing voltages, and may be provided to the sensing structure 400 through the sensing signal transmission film 410.

The image signal transmission film 910 may be disposed in the second portion of the non-display region NDA on the first substrate 100, and may be electrically connected to the display structure 200. The first substrate 100 may include an image pad electrode disposed in the second portion, and the image signal transmission film 910 may be electrically connected to the display structure 200 through the image pad electrode.

In an exemplary embodiment of the inventive concept, after the image signal transmission film 910 is disposed in the second portion, the image signal transmission film 910 may be bent along a second bending axis AX2 (as shown in FIG. 1). Accordingly, the image signal transmission film 910 may cover a portion of the upper surface S2 of the first substrate 100 and a portion of the lower surface S1 of the first substrate 100 (as shown in FIG. 4). For example, the image signal transmission film 910 may include a flexible printed circuit board.

In an exemplary embodiment of the inventive concept, the image driver 930 may be disposed in the image signal transmission film 910, and the image driver 930 may generate an image signal. The image signal may include a gate signal, a data signal, an initial voltage, an emission control signal, a power voltage, etc.

In an exemplary embodiment of the inventive concept, the display device 1000 may include the sensing signal transmission film 410 and the image signal transmission film 910 which are disposed to face each other, so that each of the radius of curvature of the sensing signal transmission film 410 and the radius of curvature of the image signal transmission film 910 may be minimized. Accordingly, a size or area of the non-display region NDA of the display device 1000 may be reduced.

The first and second align keys 600 and 700 may be disposed in the first portion of the first substrate 100. After the sensing signal transmission film 410 is aligned to a target position of the first portion through the first and second align keys 600 and 700, the sensing signal transmission film 410 may be disposed on the sensing pad electrode. In an exemplary embodiment, the first and second align keys 600 and 700 may be disposed between the display structure 200 and the sealing member 350.

The third align key 800 may be disposed in the second portion on the first substrate 100. After the image signal transmission film 910 is aligned to a target position of the second portion through the third align key 800, the image signal transmission film 910 may be disposed on the image pad electrode. In an exemplary embodiment, the sealing member 350 may be disposed between the display structure 200 and the third align key 800.

Meanwhile, positions and numbers of the align keys may be set in various ways as needed. For example, as shown in FIG. 2, the first align key 600 (e.g., cross shape) may be disposed at each of a left side, a center, and a right side of the first portion on the first substrate 100. The second align key 700 (e.g., step shape) may be adjacent to the first align key 600 and may be disposed in a same number as the first align key 600. For example, if three first align keys 600 are disposed in the first portion, there may also be three second align keys 700 disposed in the first portion. The third align key 800 may be disposed at each of a left side and a right side of the second portion on the first substrate 100. However, the positions and the numbers of the align keys included in the display device 1000 are not limited thereto.

Meanwhile, a width between the sealing member 350 in the first portion of the non-display region NDA and the display structure 200 may be refeed to as a first width W1. In addition, a width between the sealing member 350 in the second portion of the non-display region NDA and the end of the first substrate 100 may be referred to as a second width W2. To reduce the non-display region NDA of the display device 1000, the first width W1 and the second width W2 may each be reduced. In some exemplary embodiments, the first width W1 and the second width W2 may be reduced, so areas of the first and second align keys 600 and 700 and an area of the third align key 800 may be reduced as well. However, when the areas of the align keys are reduced, the align keys might not be clearly recognizable.

Meanwhile, since a fan-out wiring and the image pad electrode for driving the display structure 200 are disposed in the second portion on the first substrate 100, the second width W2 may be configured to be larger than the first width W1. Thus, the area of the align keys corresponding to the first width W1 may be smaller than the area of the align keys corresponding to a second width W2. Therefore, each of the first and second align keys 600 and 700 may have a small area and a high contrast may be needed.

In an exemplary embodiment of the inventive concept, an area of the second align key 700 may be smaller than an area of the first align key 600. In another exemplary embodiment, the area of the first align key 600 may be larger than the area of the second align key 700, and an area of the third align key 800 may be larger than the area of the first align key 600.

Figure 5:
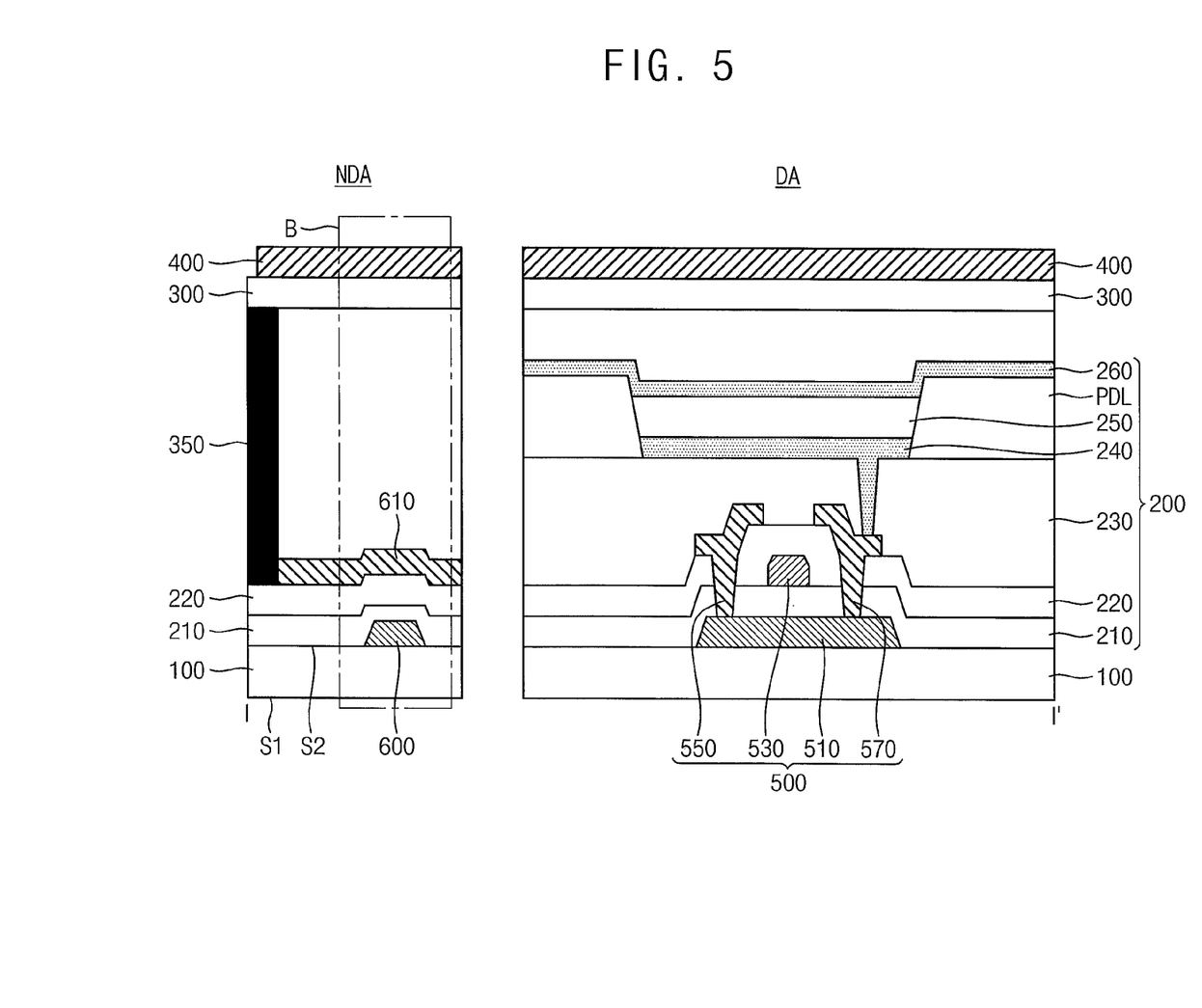
FIG. 5 is a cross-sectional view taken along line I-I' of FIG. 3 according to an exemplary embodiment of the inventive concept.
Figure 6:
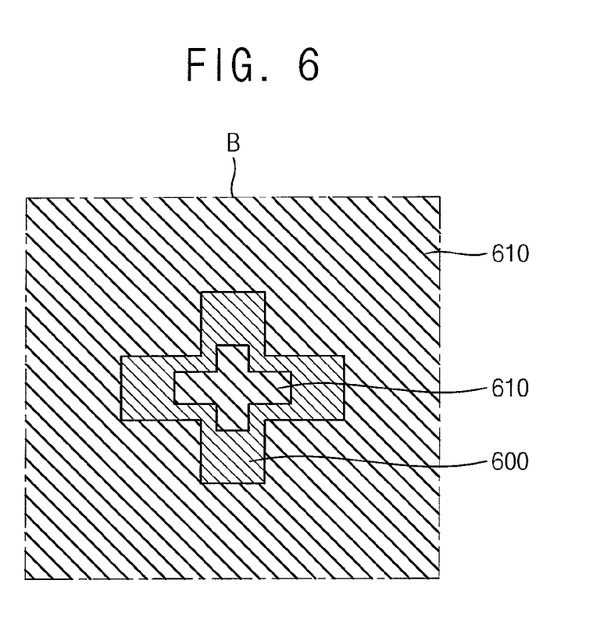
FIG. 6 is an enlarged view of region B of FIG. 3 according to an exemplary embodiment of the inventive concept.

FIG. 5 is a cross-sectional view taken along line I-I' of FIG. 3 and FIG. 6 is an enlarged view of region B of FIG. 3.

Referring to FIGS. 3, 4, 5, and 6, a transistor 500, a first insulating layer 210, a second insulating layer 220, a via insulating layer 230, a first electrode 240, a pixel defining layer PDL, an organic emission layer 250, a second electrode 260, the second substrate 300 and the sensing structure 400 may be sequentially disposed in the display region DA on the first substrate 100. The first align key 600, the first insulating layer 210, the second insulating layer 220, a metal pattern 610, the sealing member 350, the second substrate 300 and the sensing structure 400 may be sequentially disposed in the non-display region NDA on the first substrate 100.

The first substrate 100 may include a glass substrate, a quartz substrate, and a plastic substrate. In an exemplary embodiment, the first substrate 100 may include the glass substrate that transmits light. Accordingly, components disposed on the upper surface S2 of the first substrate 100 may be recognized through the lower surface S1 of the first substrate 100. In another exemplary embodiment, the first substrate 100 may include the plastic substrate having ductility (e.g., flexibility), and the plastic substrate may transmit light.

In an exemplary embodiment of the inventive concept, a buffer layer may be further disposed on the first substrate 100. The buffer layer may prevent a diffusion of metal atoms or impurities from the first substrate 100 into an active pattern 510. In addition, in order to form the active pattern 510 uniformly, the buffer layer may control a rate of heat transfer during a crystallization process to form the active pattern 510.

The active pattern 510 may be disposed on the buffer layer. In an exemplary embodiment, the active pattern 510 may include a silicon semiconductor such as an amorphous silicon and/or a polycrystalline silicon. In another exemplary embodiment, the active pattern 510 may include a metal oxide semiconductor. The active pattern 510 may be doped with impurities to form the transistor 500, so that the active pattern 510 does not transmit light.

In an exemplary embodiment of the inventive concept, the first align key 600 may be disposed on the first substrate 100. In this case, the first align key 600 may be disposed on a same layer as the active pattern 510, and the first align key 600 and the active pattern 510 may be simultaneously (or concurrently) formed using a same material. Accordingly, the first align key 600 might not transmit light. Therefore, the first align key 600 may be recognized through the lower surface S1 of the first substrate 100.

In addition, in an exemplary embodiment of the inventive concept, as shown in FIG. 6, a planar shape of the first align key 600 may be a cross-shape. In this case, the first align key 600 may include a cross-shaped opening therein.

The first insulating layer 210 may cover the active pattern 510. The first insulating layer 210 may include an insulating material. For example, the first insulating layer 210 may include a silicon oxide (SiO), a silicon nitride (SiNs), a titanium oxide (TiO), a tantalum oxide (TaO), or the like.

The gate electrode 530 may be disposed on the first insulating layer 210. The gate electrode 530 may include a metal, an alloy, a conductive metal oxide, or the like. For example, the gate electrode 530 may include gold (Au), silver (Ag), copper (Cu), nickel (Ni), chromium (Cr), aluminum (Al), tungsten (W), molybdenum (Mo), titanium (Ti), tantalum (Ta), or an alloy of these, and may have a single layer structure or a multi-layer structure including different metal layers.

The second insulating layer 220 may cover the gate electrode 530. The second insulating layer 220 may include an insulating material. For example, the second insulating layer 220 may include $SiO_x$, $SiN_x$, $TiO_x$, $TaO_x$, or the like. Meanwhile, the first and second insulating layers 210 and 220 may transmit light, so that components disposed on an upper surface of the second insulating layer 220 may be recognized through the lower surface S1 of the first substrate 100.

A source electrode 550 and a drain electrode 570 may be disposed on the second insulating layer 220. The source and drain electrodes 550 and 570 may be in contact with the active pattern 510 through a contact hole formed by removing a portion of the first and second insulating layers 210 and 220, and may constitute the transistor 500 together with the active pattern 510 and the gate electrode 530. The source and drain electrodes 550 and 570 may include a metal, an alloy, a conductive metal oxide, or the like. For example, each of the source and drain electrodes 550 and 570 may include Au, Ag, Cu, Ni, Cr, Al, W, Mo, Ti, Ta, or an alloy of these, and may have a single layer structure or a multi-layer structure including different metal layers. For example, each of the source and drain electrodes 550 and 570 may have a Ti/A/Ti stacked structure.

In an exemplary embodiment of the inventive concept, the metal pattern 610 may overlap the first align key 600 and may be disposed between the display structure 200 and the sealing member 350. The metal pattern 610 might not transmit light. Accordingly, the metal pattern 610 may prevent a light leakage phenomenon where light generated from the display structure 200 leaks to the first portion of the non-display region NDA of the display device 1000.

The via insulating layer 230 may have a larger thickness to sufficiently cover the source and drain electrodes 550 and 570, and may have a substantially flat upper surface. The via insulating layer 230 may include an organic material or an inorganic material. For example, the via insulating layer 230 may include a polyacrylates resin, a polyimides resin, a polyamides resin, a photoresist, or the like. In addition, the via insulating layer 230 may have a multi-layer structure.

The first electrode 240 may be disposed on the via insulating layer 230. The first electrode 240 may be in contact with the drain electrode 570 through a contact hole formed by removing a portion of the via insulating layer 230. The first electrode 240 may include a metal, an alloy, a conductive metal oxide, or the like. For example, the first electrode 240 may include Au, Ag, Cu, Ni, Cr, Al, W, Mo, Ti, Ta, an alloy of these, an indium tin oxide ITO, or an indium zinc oxide IZO.

The pixel defining layer PDL may be disposed on the via insulating layer 230. In an exemplary embodiment, the pixel defining layer PDL may include an opening, and an emission material included in the organic emission layer 250 may be disposed in the opening. Accordingly, the pixel defining layer PDL may define a region in which the organic emission layer 250 is formed. In another exemplary embodiment, the pixel defining layer PDL may function as a light blocking member. In this case, the pixel defining layer PDL may include a black pigment or a black dye.

The organic emission layer 250 may be disposed on the pixel defining layer PDL and the first electrode 240. The organic emission layer 250 may include at least one of emission materials emitting a red light, a green right, or a blue light.

The second electrode 260 may be disposed on the organic emission layer 250 and the pixel defining layer PDL. The second electrode 260 may include a metal, an alloy, a conductive metal oxide, or the like. For example, the second electrode 260 may include Au Ag, Cu, Ni, Cr, Al, W, Mo, Ti, Ta, an alloy of these, ITO, IZO, or the like.

As described above, the first align key 600 may be recognized through the lower surface S1 of the first substrate 100. For example, as shown in FIG. 6, the first align key 600 having the cross-shape may be recognized through the lower surface S1 of the first substrate 100, and the metal pattern 610 may be recognized through a periphery of the first align key 600 and the opening located in a center of the first align key 600.

Figure 7:
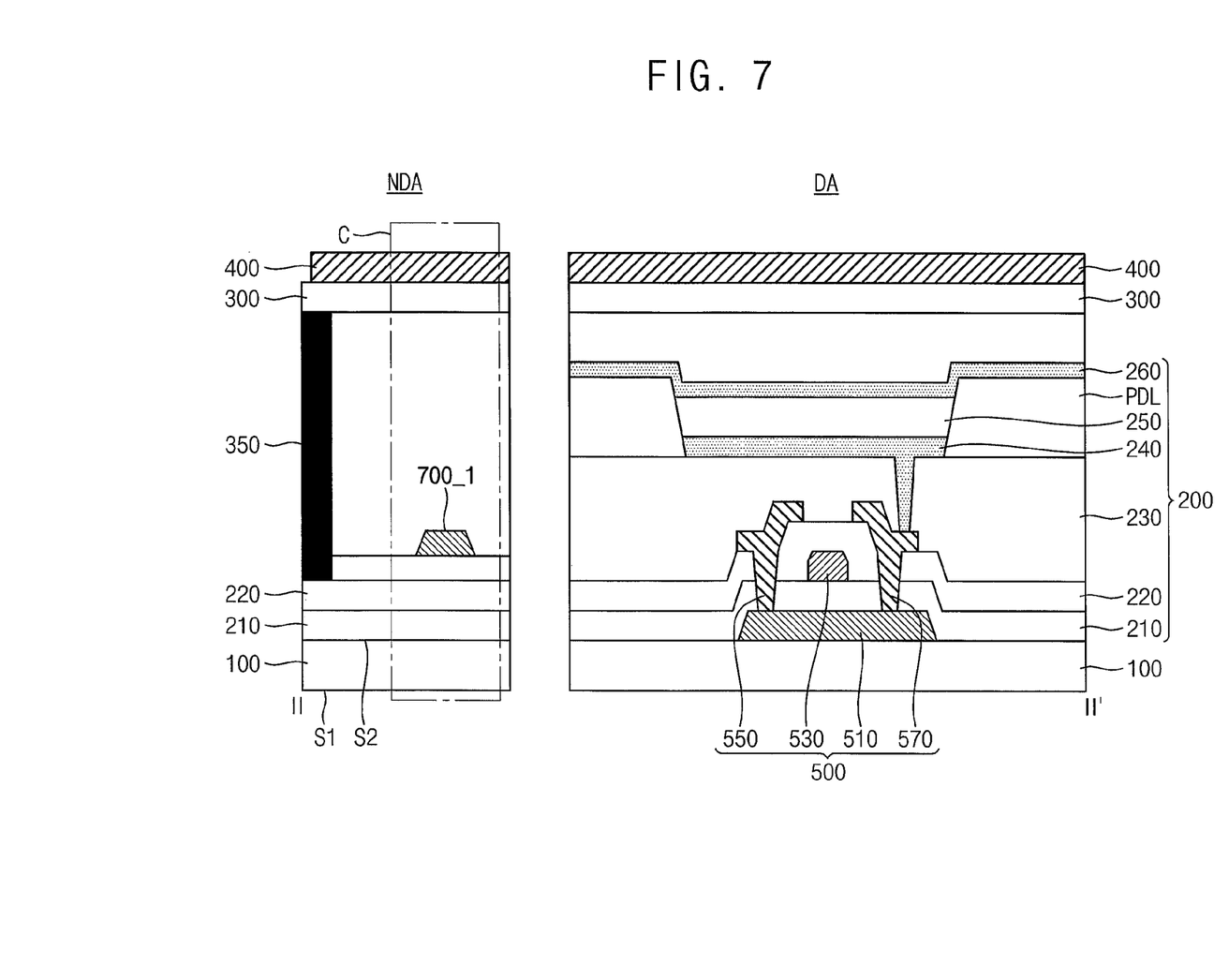
FIG. 7 is a cross-sectional view taken along line II-II' of FIG. 3 according to an exemplary embodiment of the inventive concept.
Figure 8:
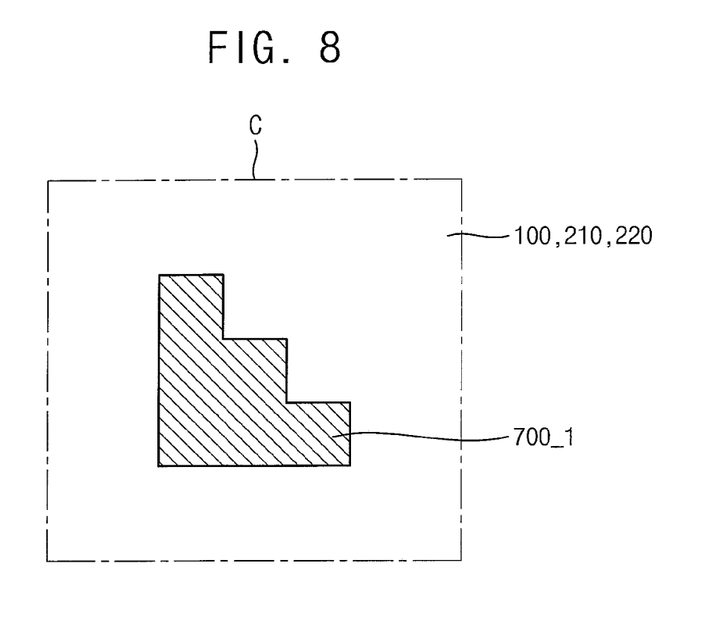
FIG. 8 is an enlarged view of region C of FIG. 3 according to an exemplary embodiment of the inventive concept.
Figure 9:
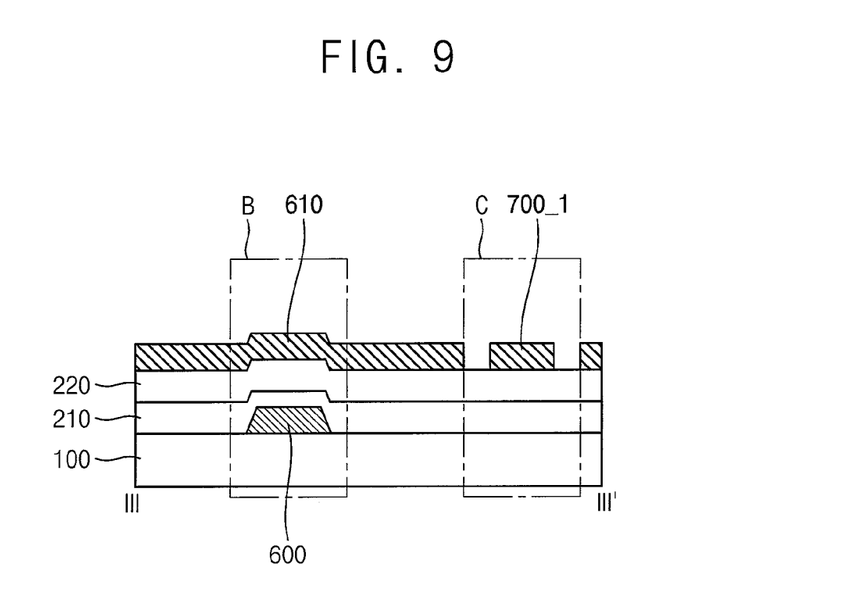
FIG. 9 is a cross-sectional view taken along line III-III' of FIG. 3 according to an exemplary embodiment of the inventive concept.

FIG. 7 is a cross-sectional view taken along line II-II' of FIG. 3, FIG. 8 is an enlarged view of region C of FIG. 3, and FIG. 9 is a cross-sectional view taken along line III-III' of FIG. 3.

Referring to FIGS. 3, 4, 7, and 8, the transistor 500, the first insulating layer 210, the second insulating layer 220, the via insulating layer 230, the first electrode 240, the pixel defining layer PDL, the organic emission layer 250, the second electrode 260, the second substrate 300 and the sensing structure 400 may be sequentially disposed in the display region DA on the first substrate 100. The first insulating layer 210, the second insulating layer 220, a second align key 7001, the sealing member 350, the second substrate 300, and the sensing structure 400 may be sequentially disposed in the non-display region NDA on the first substrate 100. However, the transistor 500, the first insulating layer 210, the second insulating layer 220, the via insulating layer 230, the first electrode 240, the pixel defining layer PDL, the organic emission layer 250, the second electrode 260, the second substrate 300, the sealing member 350, and the sensing structure 400 may be the same as described above. Therefore, the second align key 700_1 will be mainly described below.

In an exemplary embodiment of the inventive concept, the second align key 700_1 may be disposed on the second insulating layer 220. In this case, the second align key 7001 may be disposed on a same layer as the source and drain electrodes 550 and 570, and may be formed of a same material as the source and drain electrodes 550 and 570.

In addition, in an exemplary embodiment of the inventive concept, a planar shape of the second align key 700_1 may be a step shape (as illustrated in FIG. 8). Meanwhile, the planar shapes of the first and second align keys 600 and 700_1 may be set in various forms (e.g., shapes) as needed. However, since the first and second align keys 600 and 700_1 are used complementarily, it may be preferable that the planar shapes of the first and second align keys 600 and 700_1 are set differently.

As shown in FIG. 8, the second align key 700_1 may be recognized through the lower surface S1 of the first substrate 100. The first substrate 100, the first insulating layer 210, and the second insulating layer 220 may be positioned around the second align key 7001. In this case, since the second align key 7001 does not transmit light while the first substrate 100, the first insulating layer 210, and the second insulating layer 220 all transmit light, the second align key 700_1 may have a high contrast.

The sensing signal transmission film 410 may be accurately aligned through the second align key 700_1 after being first aligned through the first align key 600. In an exemplary embodiment of the inventive concept, an area of the first align key 600 may be larger than an area of the second align key 7001. Therefore, the first align key 600 may be used when the second align key 7001 is not clearly recognized. For example, the second align key 700_1 might not be clearly recognized when impurities cover the second align key 7001 or when light is refracted due to damage of the first substrate 100 around the second align key 700_1.

In addition, the second align key 700_1 may be used when the first align key 600 is not clearly recognized. For example, the first align key 600 might not be clearly recognized when a contrast of the first align key 600 is poor.

According to exemplary embodiments of the inventive concept, to align and arrange the sensing signal transmission film 410, the first align key 600 and the second align key 7001 may be used complementarily.

Referring to FIG. 9, the first align key 600 and the second align key 700_1 may be arranged on different layers and the second align key 700_1 may be disposed on a same layer as the metal pattern 610. In this case, the second align key 700_1 may be formed of a same material as the metal pattern 610, and the metal pattern 610 may be spaced apart from the second align key 700_1.

As described above, the metal pattern 610 may be removed around the second align key 700_1 that has a small area, the metal pattern 610 may prevent a light leakage phenomenon that may occur in the first portion of the non-display region NDA. In addition, since the metal pattern 610 is not disposed around the second align key 7001, the second align key 7001 may have a high contrast.

Figure 10:
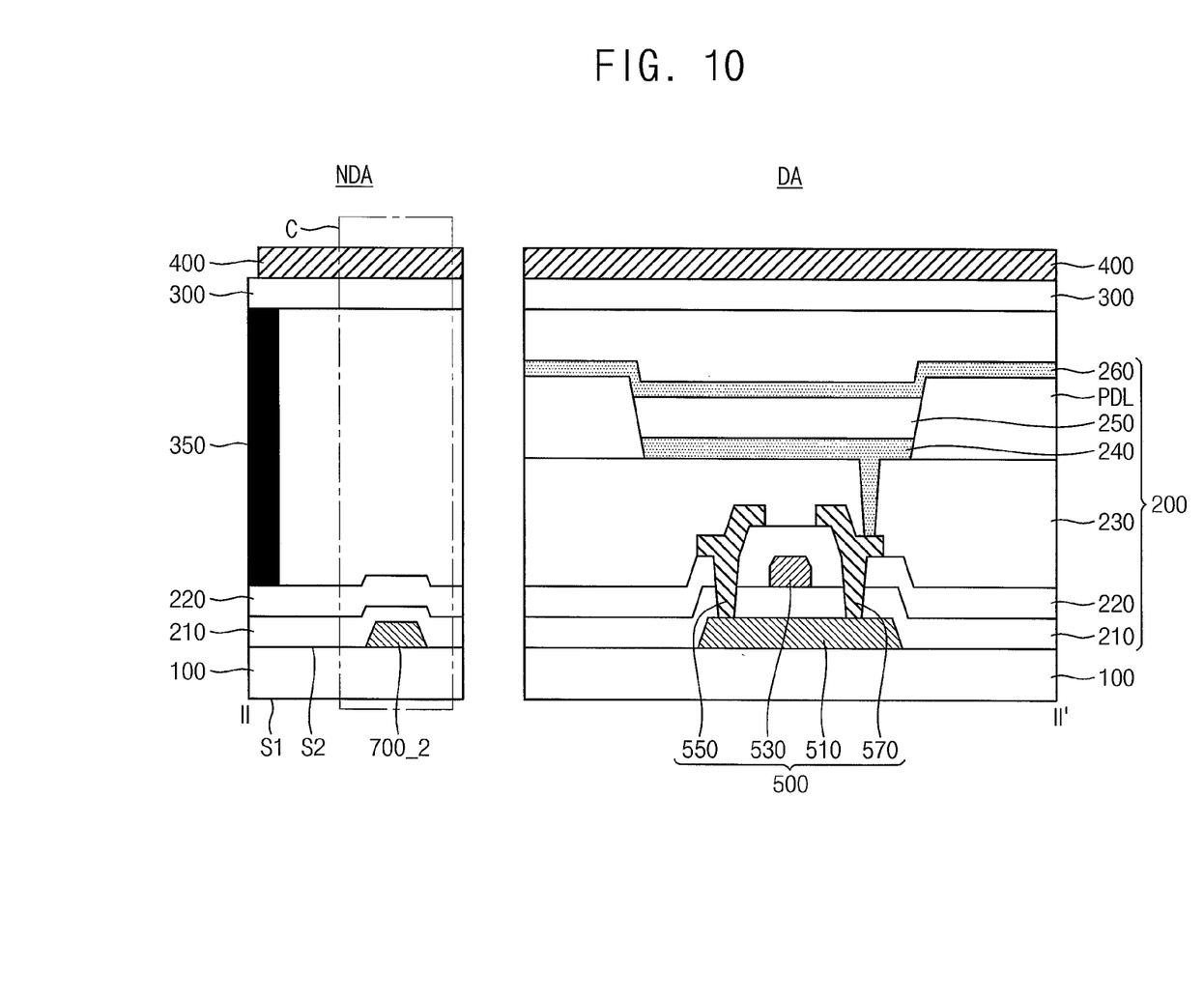
FIGS. 10 and 11 are diagrams illustrating an example of a second align key according to an exemplary embodiment of the inventive concept.
Figure 11:
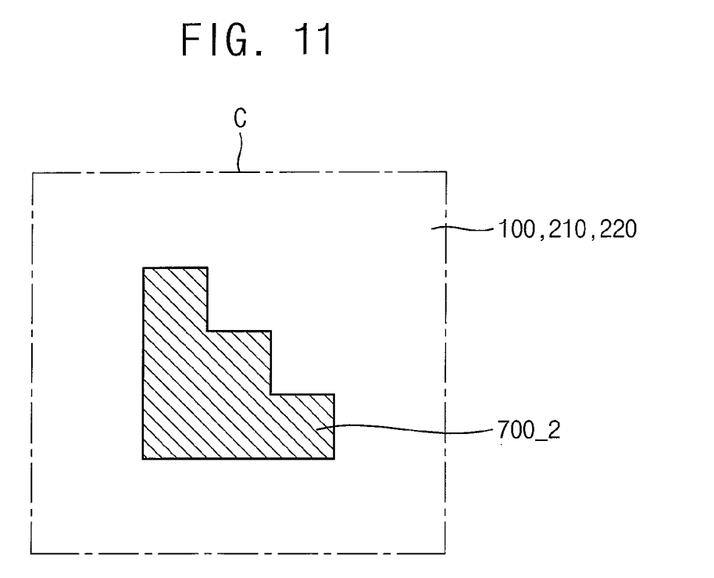

FIGS. 10 and 11 are diagrams illustrating another example of a second align key according to an exemplary embodiment of the inventive concept.

Referring to FIGS. 3, 4, 10, and 11, the second align key 700_2 may be disposed on a same layer as the active pattern 510. In one example, although not shown, the second align key 700_2 may be disposed on a same layer as the gate electrode 530. The second align key 700_2 may be formed of a same material as the active pattern 510 or the gate electrode 530 that does not transmit light. In addition, since the first substrate 100, the first insulating layer 210 and the second insulating layer 220 that transmit light is positioned around the second align key 700_2, the second align key 7002 may have a high contrast. Accordingly, the second align key 700_2 may be clearly recognized.

Figure 12:
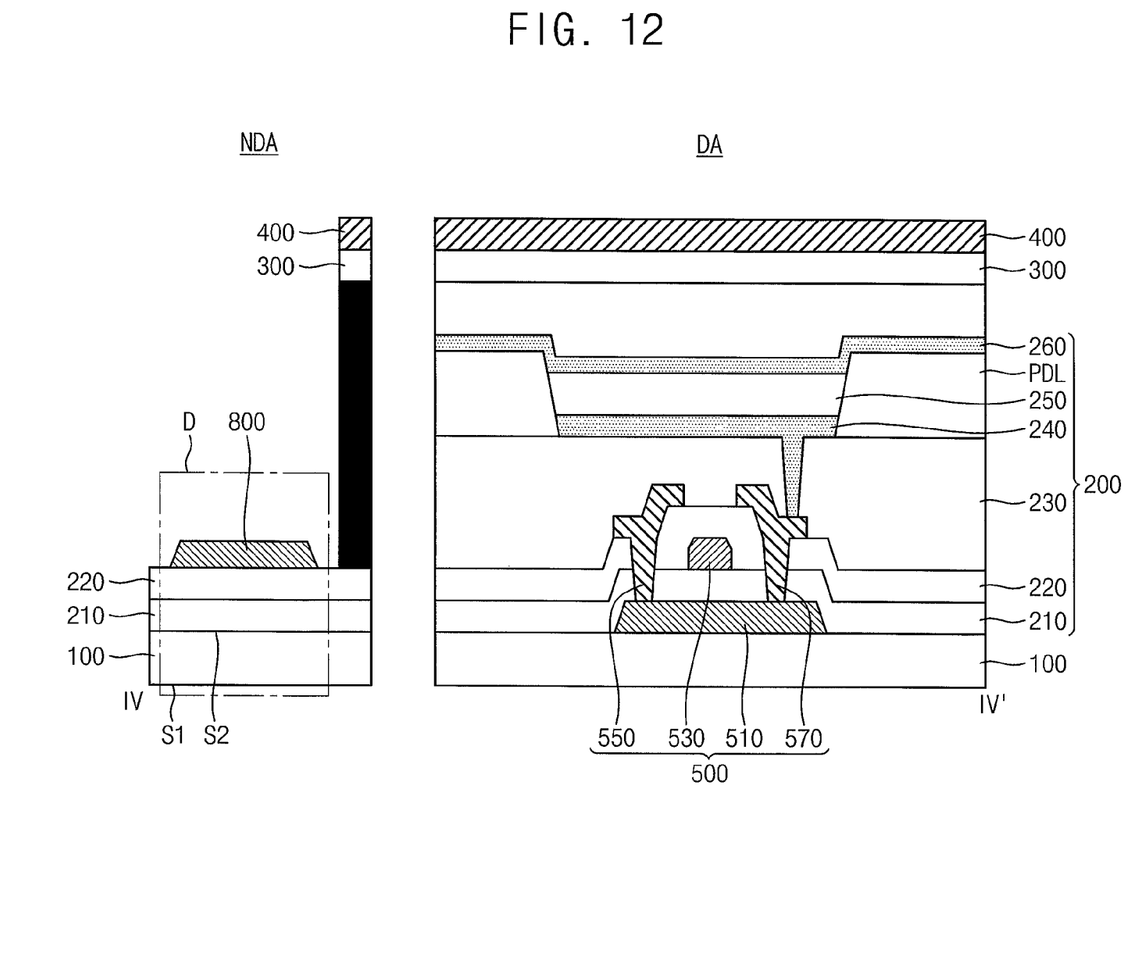
FIG. 12 is a cross-sectional view taken along line IV-IV' of FIG. 1 according to an exemplary embodiment of the inventive concept.
Figure 13:
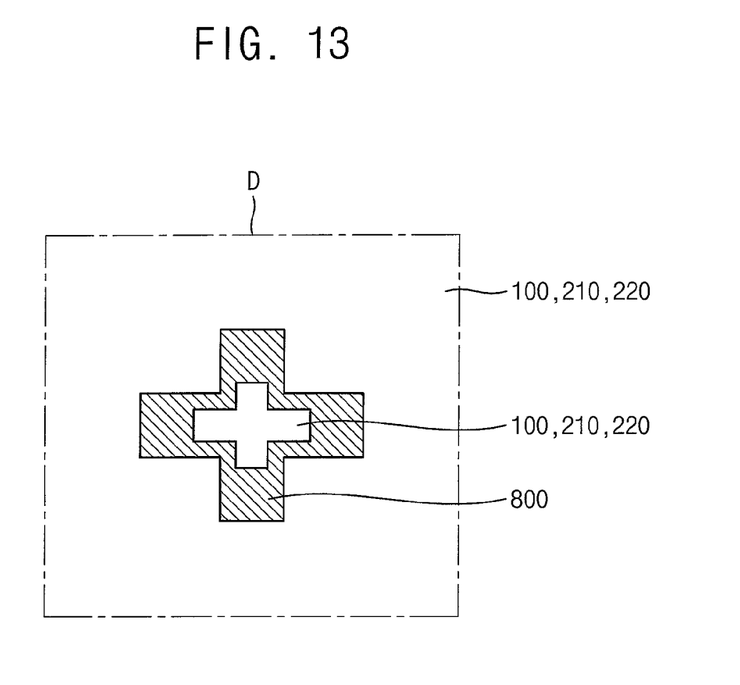
FIG. 13 is an enlarged view of region D of FIG. 2 according to an exemplary embodiment of the inventive concept.

FIG. 12 is a cross-sectional view taken along line IV-IV' of FIG. 1, and FIG. 13 is an enlarged view of region D of FIG. 2.

Referring to FIGS. 2, 12, and 13, the transistor 500, the first insulating layer 210, the second insulating layer 220, the via insulating layer 230, the first electrode 240, the pixel defining layer PDL, the organic emission layer 250, the second electrode 260, the second substrate 300 and the sensing structure 400 may be sequentially disposed in the display region DA on the first substrate 100. The first insulating layer 210, the second insulating layer 220, a third align key 800, the sealing member 350, the second substrate 300, and the sensing structure 400 may be sequentially disposed in the non-display region NDA on the first substrate 100. However, the transistor 500, the first insulating layer 210, the second insulating layer 220, the via insulating layer 230, the first electrode 240, the pixel defining layer PDL, the organic emission layer 250, the second electrode 260, the second substrate 300, the sealing member 350, and the sensing structure 400 may be the same as described above. Therefore, the third align key 800 will be mainly described below.

In an exemplary embodiment of the inventive concept, a planar shape of the third align key 800 may be a cross-shape, and the third align key 800 may include a cross-shaped opening. In some cases, the third align key 800 may have a same shape as the first align key 600.

In an exemplary embodiment of the inventive concept, an area of the third align key 800 may be larger than the area of the first align key 600, and the area of the first align key 600 may be larger than the area of the second align key 700.

The third align key 800 may be recognized through the lower surface S1 of the first substrate 100. For example, as shown in FIG. 13, the third align key 800 having the cross shape may be recognized through the lower surface S1 of the first substrate 100. In this case, the first substrate 100, the first insulating layer 210, and the second insulating layer 220 may be positioned around the third align key 800. Since the third align key 800 does not transmit light while the first substrate 100, the first insulating layer 210, and the second insulating layer 220 all transmit light, the third align key 800 may have a high contrast. Accordingly, the third align key 800 may be clearly recognized.

Since the third align key 800 has a sufficient area and a high contrast, even if the display device 1000 does not include a separate align key that can be used as a complement to the third align key 800, the image signal transmission film 910 may still be accurately aligned and disposed at a target position on the second portion of the non-display region NDA. However, embodiments of the present inventive concept are not limited thereto, and it will be apparent to one of ordinary skill in the art that the display device 1000 may include a separate align key adjacent to the third align key 800.

Meanwhile, the display device 1000 which is an organic light emitting display device including the organic emission layer is described above, but the display device 1000 according to embodiments of the present inventive concept is not limited thereto. For example, the display device 1000 may be a liquid crystal display LCD including liquid crystals.

According to some exemplary embodiments of the inventive concept, the display device 1000 may include the sensing signal transmission film 410 and the image signal transmission film 910 disposed to face each other. Therefore, as described above, the display device 1000 may minimize the radius of curvature of the sensing signal transmission film 410 and the radius of curvature of the image signal transmission film 910, and the size or area of the non-display region NDA may be reduced.

In addition, to align and arrange the sensing signal transmission film 410 and the image signal transmission film 910, the display device 1000 may include the first to third align keys 600, 700 and 800 described above. Therefore, the sensing signal transmission film 410 and the image signal transmission film 910 may be accurately aligned and arranged.

Embodiments of the present inventive concept may be applied to display devices and electronic devices including the display devices. For example, the present inventive concept may be applied to a cellular phone, a smart phone, a video phone, a smart pad, a smart watch, a tablet PC, a car navigation system, a television, a computer monitor, a laptop or notebook computer, a head mounted display device, an MP3 player, etc.

While the inventive concept has been particularly shown and described with reference to the exemplary embodiments thereof, it will be understood by one of ordinary skill in the art that variations in form and detail may be made therein without departing from the spirit and scope of the inventive concept as defined by the following claims.

What is claimed is:
1. A display device, comprising:
 a first substrate including a display region and a non-display region at least partially surrounding the display region, wherein the non-display region includes a first portion and a second portion facing the first portion;
 a display structure disposed in the display region;
 a sensing structure disposed on the display structure;
 a first align key and a second align key, wherein the second align key is disposed adjacent to the first align key;
 a sensing signal transmission film disposed in the first portion of the non-display region, the sensing signal transmission film being electrically connected to the sensing structure;
 an image signal transmission film disposed in the second portion of the non-display region, the image signal transmission film being electrically connected to the display structure;
 a second substrate facing the first substrate; and
 a sealing member disposed between the first substrate and the second substrate, the sealing member at least partially surrounding the display structure,
 wherein the first align key is disposed between the display structure and the sealing member.
2. The display device of claim 1, wherein the sensing signal transmission film is disposed on the second substrate.
3. The display device of claim 1, wherein:
 the first align key is disposed in the first portion on the first substrate.

4. The display device of claim 1, wherein the display structure includes:
an active pattern disposed on the first substrate;
a gate electrode disposed on the active pattern;
a source electrode disposed on the gate electrode; and
a drain electrode disposed on the gate electrode,
wherein the first align key is disposed on a same layer as the active pattern.

5. The display device of claim 4, further comprising:
a metal pattern disposed on the first align key,
wherein the metal pattern at least partially overlaps the first align key, and
wherein the metal pattern is disposed on a same layer as the source and drain electrodes.

6. The display device of claim 5, further comprising:
an insulating layer disposed between the first align key and the metal pattern, the insulating layer configured to transmit light.

7. The display device of claim 1, wherein:
the second align key is disposed in the first portion of the first substrate.

8. The display device of claim 1, wherein an area of the second align key is smaller than an area of the first align key.

9. The display device of claim 1, wherein a shape of the first align key is different from a shape of the second align key.

10. The display device of claim 1,
wherein a planar shape of the first align key is a cross-shape,
wherein the first align key has a cross-shaped opening, and
wherein a planar shape of the second align key is a step shape.

11. The display device of claim 1, wherein the second align key is disposed between the display structure and the sealing member.

12. The display device of claim 4, wherein the second align key is disposed on a same layer as the source and drain electrodes.

13. The display device of claim 5,
wherein the second align key is disposed on a same layer as the metal pattern, and
wherein the metal pattern is spaced apart from the second align key.

14. The display device of claim 4, wherein the second align key is disposed on a same layer as the active pattern.

15. The display device of claim 1, wherein the sensing signal transmission film is disposed on the second substrate through the first and second align keys.

16. The display device of claim 1, further comprising:
a third align key disposed in the second portion of the first substrate.

17. The display device of claim 16, wherein the sealing member is disposed between the display structure and the third align key.

18. A display device, comprising:
a first substrate including a display region and a non-display region at least partially surrounding the display region, wherein the non-display region includes a first portion and a second portion facing the first portion;
a display structure disposed in the display region;
a second substrate facing the first substrate, the second substrate including a sealing member at least partially surrounding a boundary of the second substrate;
a sensing structure disposed on the second substrate;
a sensing signal transmission film disposed in the first portion of the non-display region, the sensing signal transmission film being electrically connected to the sensing structure;
an image signal transmission film disposed in the second portion of the non-display region, the image signal transmission film being electrically connected to the display structure;
a first align key and a second align key which are disposed in the first portion; and
a third align key disposed in the second portion,
wherein the display structure includes:
an active pattern disposed on the first substrate;
a gate electrode disposed on the active pattern;
a source electrode disposed on the gate electrode; and
a drain electrode disposed on the gate electrode,
wherein the first align key is disposed on a same layer as the active pattern, and each of the second and third align keys is disposed on a same layer as the source and drain electrodes, and
wherein an area of the first align key is larger than an area of the second align key, and an area of the third align key is larger than the area of the first align key.

* * * * *